(12) United States Patent
Miao et al.

(10) Patent No.: US 11,382,108 B2
(45) Date of Patent: Jul. 5, 2022

(54) DATA TRANSMISSION METHOD, AND APPARATUS

(71) Applicant: Huawei Technologies Co., Ltd., Shenzhen (CN)

(72) Inventors: Jinhua Miao, Beijing (CN); Wei Quan, Beijing (CN); Jian Zhang, Beijing (CN); Bingzhao Li, Beijing (CN); Xiaodong Yang, Shenzhen (CN); Zhenxing Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 107 days.

(21) Appl. No.: 15/809,640

(22) Filed: Nov. 10, 2017

(65) Prior Publication Data
US 2018/0098339 A1 Apr. 5, 2018

Related U.S. Application Data

(63) Continuation of application No. PCT/CN2015/078826, filed on May 13, 2015.

(51) Int. Cl.
*H04W 72/12* (2009.01)
*H04L 5/00* (2006.01)
(Continued)

(52) U.S. Cl.
CPC ....... *H04W 72/1231* (2013.01); *H04L 5/0044* (2013.01); *H04W 72/042* (2013.01);
(Continued)

(58) Field of Classification Search
CPC ......... H04W 72/1231; H04W 72/0413; H04W 72/042; H04W 72/0446; H04W 72/1289; H04W 72/14; H04L 5/0044; H04L 5/0053
(Continued)

(56) References Cited

U.S. PATENT DOCUMENTS

2009/0073902 A1 3/2009 Astely et al.
2010/0254288 A1 10/2010 Lim et al.
(Continued)

FOREIGN PATENT DOCUMENTS

CN 101860429 A 10/2010
CN 102316587 A 1/2012
(Continued)

OTHER PUBLICATIONS

"Way forward on Special sub-frame patterns for FS2," TSG-RAN WG1 #51bis, Sevilla, Spain, R1-080602, 3rd Generation Partnership Project, Valbonne, France (Jan. 14-18, 2008).
(Continued)

*Primary Examiner* — Chi Tang P Cheng
(74) *Attorney, Agent, or Firm* — Leydig, Voit & Mayer, Ltd.

(57) ABSTRACT

A data transmission method is disclosed to improve service scheduling flexibility. The method includes: sending, by a base station, configuration information to a terminal, where the configuration information includes symbol quantity information, and the symbol quantity information is used to indicate a quantity of symbols that are used when the base station performs data exchange with the terminal; and sending, by the base station to the terminal, data transmitted in unit of a symbol, or receiving data transmitted in unit of a symbol, where the data occupies m symbols in a time domain, and m is a quantity that is indicated in the configuration information and that is of symbols that are used.

10 Claims, 7 Drawing Sheets

(51) Int. Cl.
*H04W 72/04* (2009.01)
*H04W 72/14* (2009.01)
(52) U.S. Cl.
CPC ... *H04W 72/0413* (2013.01); *H04W 72/0446* (2013.01); *H04L 5/0053* (2013.01); *H04W 72/1289* (2013.01); *H04W 72/14* (2013.01)
(58) Field of Classification Search
USPC .......................................................... 370/336
See application file for complete search history.

(56) References Cited

U.S. PATENT DOCUMENTS

| | | | | |
|---|---|---|---|---|
| 2011/0182245 A1* | 7/2011 | Malkamaki | ........... | H04L 1/1812 370/329 |
| 2011/0261774 A1* | 10/2011 | Lunttila | ................ | H04L 1/1858 370/329 |
| 2011/0268046 A1* | 11/2011 | Choi | ..................... | H04L 5/0007 370/329 |
| 2013/0039292 A1* | 2/2013 | Liu | ........................ | H04W 72/04 370/329 |
| 2013/0064190 A1* | 3/2013 | Hariharan | ............. | H04L 1/0031 370/329 |
| 2013/0064209 A1* | 3/2013 | Tiirola | .................... | H04L 5/001 370/329 |
| 2013/0279481 A1 | 10/2013 | Horiuchi et al. | | |
| 2013/0308596 A1 | 11/2013 | Nam et al. | | |
| 2014/0126432 A1 | 5/2014 | Wang et al. | | |
| 2014/0198680 A1 | 7/2014 | Siomina et al. | | |
| 2014/0362758 A1* | 12/2014 | Lee | ...................... | H04L 5/0037 370/312 |
| 2015/0043468 A1* | 2/2015 | Seo | ....................... | H04L 5/0053 370/329 |
| 2015/0131565 A1 | 5/2015 | Nakashima et al. | | |
| 2016/0234829 A1 | 8/2016 | Takahashi et al. | | |
| 2016/0316459 A1 | 10/2016 | Popovic et al. | | |
| 2017/0164363 A1 | 6/2017 | Zhang et al. | | |

FOREIGN PATENT DOCUMENTS

| | | | | |
|---|---|---|---|---|
| CN | 102508815 A | 6/2012 | | |
| CN | 104380826 A | 2/2015 | | |
| CN | 104468030 A | 3/2015 | | |
| CN | 104769859 A | 7/2015 | | |
| JP | 2010539785 A | 12/2010 | | |
| JP | 2015509320 A | 3/2015 | | |
| JP | 2016507987 A | 3/2016 | | |
| WO | 2012046403 A1 | 4/2012 | | |
| WO | 2013141770 A1 | 9/2013 | | |
| WO | WO-2013141770 A1 * | 9/2013 | ........... | H04L 5/1469 |
| WO | 2014048184 A1 | 4/2014 | | |
| WO | 2015008830 A1 | 1/2015 | | |

OTHER PUBLICATIONS

"3rd Generation Partnership Project; Technical Specification Group Radio Access Network;Evolved Universal Terrestrial Radio Access (E-UTRA); Physical layer procedures (Release 12)," 3GPP TS 36.213 V12.5.0, 3rd Generation Partnership Project, Valbonne, France (Mar. 2015).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.5.0, 3rd Generation Partnership Project, Valbonne, France (Mar. 2015).

* cited by examiner

DATA TRANSMISSION METHOD, AND APPARATUS

CROSS-REFERENCE TO RELATED APPLICATION

This application is a continuation of International Application No. PCT/CN2015/078826, filed on May 13, 2015, the disclosure of which is hereby incorporated by reference in its entirety.

TECHNICAL FIELD

Embodiments of the present invention relate to the communications field, and in particular, to a data transmission method and an apparatus.

BACKGROUND

With development and progress of communications technologies, a better network system architecture is increasingly mature, and a network data transmission rate is increasingly high. Currently, a particularly common network system architecture is an LTE (Long Term Evolution) system architecture. LTE is long term evolution of a UMTS (Universal Mobile Telecommunications System) technology standard formulated by a 3GPP (The 3rd Generation Partnership Project) organization. In an LTE system, key technologies such as OFDM (Orthogonal Frequency Division Multiplexing) and MIMO (Multi-Input & Multi-Output) are introduced. The LTE system supports interworking with another 3GPP system. According to different duplex modes, the LTE system is divided into an FDD-LTE (Frequency Division Duplexing-Long Term Evolution) system and a TDD-LTE (Time Division Duplexing-Long Term Evolution) system, and a difference between the two technologies mainly lies in a physical layer of an air interface (for example, a frame structure, time division design, and synchronization). In an FDD system, in uplink and downlink directions, data is received and sent over an air interface by using a pair of frequency bands. In a TDD system, in uplink and downlink directions, data is transmitted in different timeslots by using a same frequency band. Compared with an FDD duplex mode, a TDD duplex mode achieves higher spectrum utilization.

In an existing LTE system architecture, a minimum unit for network data transmission is a frame. An LTE protocol specifies that in a normal timeslot, one frame is 20 ms in duration and is divided into 10 subframes. In an FDD mode, each subframe is divided into two timeslots, and therefore, each timeslot is 1 ms in duration. To achieve smooth evolution into TD-SCDMA, a TDD mode is introduced. In the TDD mode, a frame is first divided into two half-frames, and each half-frame is 5 ms. Each half-frame is divided into five subframes, including four normal subframes and one special subframe. Each subframe is divided into two timeslots, and each timeslot is 0.5 ms. Therefore, currently, minimum duration of a TTI (Transmission Time Interval) is 1 ms or 0.5 ms. In a normal Normal CP (Cyclic Prefix), one timeslot includes seven symbols, and therefore, one subframe includes 14 symbols. In an extended Extended CP, one timeslot includes six symbols, and therefore, one subframe includes 12 symbols.

To reduce a transmission delay, symbol-level transmission can be implemented, that is, only a few symbols or even one symbol is required for each transmission. In the prior art, however, all subframes for transmission include multiple symbols, and a quantity of symbols for uplink transmission is the same as that of symbols for downlink transmission. Generally, uplink and downlink services are asymmetric. Therefore, if symbols are transmitted by transmitting a subframe, service scheduling is inflexible.

SUMMARY

Embodiments of the present invention provide a data transmission method and an apparatus, so as to implement service scheduling flexibility.

A first aspect of the embodiments of the present invention provides a base station, including:

a transceiver module, configured to send configuration information to a terminal, where the configuration information includes symbol quantity information, and the symbol quantity information is used to indicate a quantity of symbols that are used when the base station performs data exchange with the terminal, where the transceiver module is further configured to: send data to the terminal in unit of a symbol, or receive data sent by the terminal in unit of a symbol, where the data occupies m symbols in a time domain, and m is the quantity that is indicated in the configuration information and that is of symbols that are used; and a processing module, configured to: control the transceiver module to send the configuration information, and control the transceiver module to send the data to the terminal in unit of a symbol.

With reference to the first aspect of the embodiments of the present invention, in a first implementation of the first aspect of the embodiments of the present invention, the data includes to-be-transmitted data in a data packet that is coded and modulated in unit of a symbol.

With reference to the first aspect or the first implementation of the first aspect of the embodiments of the present invention, in a second implementation of the first aspect of the embodiments of the present invention, the processing module is further configured to:

obtain symbol-level transmission capability information of the terminal, where the symbol-level transmission capability information indicates that the terminal has a capability of performing data exchange in unit of the symbol.

With reference to any one of the first aspect, the first implementation of the first aspect, or the second implementation of the first aspect of the embodiments of the present invention, in a third implementation of the first aspect of the embodiments of the present invention, the configuration information further includes feedback interval information, the feedback interval information is used to indicate an interval for sending feedback information when the base station performs data exchange with the terminal, and the feedback interval information includes at least one of an uplink feedback interval or a downlink feedback interval.

With reference to any one of the first aspect, the first implementation of the first aspect, the second implementation of the first aspect, or the third implementation of the first aspect of the embodiments of the present invention, in a fourth implementation of the first aspect of the embodiments of the present invention, the symbol quantity information includes at least one of a quantity of symbols that are used by the base station to send the data to the terminal or a quantity of symbols that are usable when the terminal sends the data to the base station, and the quantity of symbols that are usable when the terminal sends the data to the base station is one or more values.

With reference to any one of the first aspect, the first implementation of the first aspect, the second implementation of the first aspect, the third implementation of the first aspect, or the fourth implementation of the first aspect of the embodiments of the present invention, in a fifth implementation of the first aspect of the embodiments of the present invention, the transceiver module is further specifically configured to:

send the data to the terminal in unit of a symbol by using a symbol physical downlink control channel Sym-PDCCH and a physical downlink shared channel PDSCH, where the Sym-PDCCH is used to schedule a PDSCH corresponding to the quantity of symbols that are used by the base station.

With reference to the fifth implementation of the first aspect of the embodiments of the present invention, in a sixth implementation of the first aspect of the embodiments of the present invention, the Sym-PDCCH includes modulation and coding scheme MCS control information of at least one frequency band.

With reference to any one of the first aspect, the first implementation of the first aspect, the second implementation of the first aspect, the third implementation of the first aspect, the fourth implementation of the first aspect, the fifth implementation of the first aspect, or the sixth implementation of the first aspect of the embodiments of the present invention, in a seventh implementation of the first aspect of the embodiments of the present invention, the transceiver module is further specifically configured to:

send an uplink grant to the terminal;

receive the data sent by the terminal in unit of a symbol; and send feedback information to the terminal in unit of a symbol, where a format used for the feedback information is a control signaling format used by the symbol physical downlink control channel Sym-PDCCH.

With reference to any one of the first aspect, the first implementation of the first aspect, the second implementation of the first aspect, the third implementation of the first aspect, the fourth implementation of the first aspect, the fifth implementation of the first aspect, the sixth implementation of the first aspect, or the seventh implementation of the first aspect of the embodiments of the present invention, in an eighth implementation of the first aspect of the embodiments of the present invention, the transceiver module is further specifically configured to:

receive a reference signal sent by the terminal in unit of a symbol on non-consecutive frequency domain resources.

With reference to any one of the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, or the eighth implementation of the first aspect of the embodiments of the present invention, in a ninth implementation of the first aspect of the embodiments of the present invention, the transceiver module is further specifically configured to:

send the configuration information by using any one of radio resource control RRC signaling, a media access control control element MAC CE, or physical layer control signaling.

A second aspect of the embodiments of the present invention provides a terminal, including:

a transceiver module, configured to receive configuration information sent by a base station, where the configuration information includes symbol quantity information, and the symbol quantity information is used to indicate a quantity of symbols that are used when the base station performs data exchange with the terminal, where the transceiver module is further configured to: send data to the base station in unit of a symbol, or receive data sent by the base station in unit of a symbol, where the data occupies m symbols in a time domain, and m is the quantity that is indicated in the configuration information and that is of symbols that are used; and a processing module, configured to: control the transceiver module to receive the configuration information sent by the base station, and control the transceiver module to send the data to the base station in unit of a symbol or receive the data sent by the base station in unit of a symbol.

With reference to the second aspect of the embodiments of the present invention, in a first implementation of the second aspect of the embodiments of the present invention, the data transmitted in unit of a symbol includes to-be-transmitted data in a data packet that is coded and modulated in unit of a symbol.

With reference to the second aspect or the first implementation of the second aspect of the embodiments of the present invention, in a second implementation of the second aspect of the embodiments of the present invention, the transceiver module is further configured to:

send symbol-level transmission capability information of the terminal to the base station before receiving the configuration information sent by the base station, where the symbol-level transmission capability information indicates that the terminal has a capability of performing data exchange in unit of the symbol.

With reference to any one of the second aspect, the first implementation of the second aspect, or the second implementation of the second aspect of the embodiments of the present invention, in a third implementation of the second aspect of the embodiments of the present invention, the configuration information further includes feedback interval information, the feedback interval information is used to indicate an interval for sending feedback information when the base station performs data exchange with the terminal, and the feedback interval information includes at least one of an uplink feedback interval or a downlink feedback interval.

With reference to any one of the second aspect, the first implementation of the second aspect, the second implementation of the second aspect, or the third implementation of the second aspect of the embodiments of the present invention, in a fourth implementation of the second aspect of the embodiments of the present invention, the symbol quantity information includes at least one of a quantity of symbols that are used by the base station to send the data to the terminal or a quantity of symbols that are usable when the terminal sends the data to the base station, and the quantity of symbols that are usable when the terminal sends the data to the base station is one or more values.

With reference to any one of the second aspect, the first implementation of the second aspect, the second implementation of the second aspect, the third implementation of the second aspect, or the fourth implementation of the second aspect of the embodiments of the present invention, in a fifth implementation of the second aspect of the embodiments of the present invention, the transceiver module is further specifically configured to:

receive the data sent by the base station in unit of a symbol by using a symbol physical downlink control channel Sym-PDCCH and a physical downlink shared channel PDSCH, where the Sym-PDCCH is used to schedule a PDSCH corresponding to the quantity of symbols that are used by the base station.

With reference to the fifth implementation of the second aspect of the embodiments of the present invention, in a sixth implementation of the second aspect of the embodiments of the present invention, the Sym-PDCCH includes modulation and coding scheme MCS control information of at least one frequency band.

With reference to any one of the second aspect, the first implementation of the second aspect, the second implementation of the second aspect, the third implementation of the second aspect, the fourth implementation of the second aspect, the fifth implementation of the second aspect, or the sixth implementation of the second aspect of the embodiments of the present invention, in a seventh implementation of the second aspect of the embodiments of the present invention, the transceiver module is further specifically configured to:

receive an uplink grant sent by the base station;

send the data to the base station in unit of a symbol; and receive feedback information sent by the base station in unit of a symbol, where a format used for the feedback information is a control signaling format used by the symbol physical downlink control channel Sym-PDCCH.

With reference to any one of the second aspect, the first implementation of the second aspect, the second implementation of the second aspect, the third implementation of the second aspect, the fourth implementation of the second aspect, the fifth implementation of the second aspect, the sixth implementation of the second aspect, or the seventh implementation of the second aspect of the embodiments of the present invention, in an eighth implementation of the second aspect of the embodiments of the present invention, the transceiver module is further specifically configured to:

send a reference signal to the base station in unit of a symbol on non-consecutive frequency domain resources.

With reference to any one of the second aspect, the first implementation of the second aspect, the second implementation of the second aspect, the third implementation of the second aspect, the fourth implementation of the second aspect, the fifth implementation of the second aspect, the sixth implementation of the second aspect, the seventh implementation of the second aspect, or the eighth implementation of the second aspect of the embodiments of the present invention, in a ninth implementation of the second aspect of the embodiments of the present invention, the transceiver module is further specifically configured to:

receive the configuration information sent by the base station by using any one of radio resource control RRC signaling, a media access control control element MAC CE, or physical layer control signaling.

A third aspect of the embodiments of the present invention provides a data transmission method, including:

sending, by a base station, configuration information to a terminal, where the configuration information includes symbol quantity information, and the symbol quantity information is used to indicate a quantity of symbols that are used when the base station performs data exchange with the terminal; and sending, by the base station, data to the terminal in unit of a symbol, or receiving data sent by the terminal in unit of a symbol, where the data occupies m symbols in a time domain, and m is the quantity that is indicated in the configuration information and that is of symbols that are used.

With reference to the third aspect of the embodiments of the present invention, in a first implementation of the third aspect of the embodiments of the present invention, the data transmitted in unit of a symbol includes to-be-transmitted data in a data packet that is coded and modulated in unit of a symbol.

With reference to the third aspect or the first implementation of the third aspect of the embodiments of the present invention, in a second implementation of the third aspect of the embodiments of the present invention, before the sending, by a base station, configuration information to a terminal, the method further includes:

obtaining, by the base station, symbol-level transmission capability information of the terminal, where the symbol-level transmission capability information indicates that the terminal has a capability of performing data exchange in unit of the symbol.

With reference to any one of the third aspect, the first implementation of the third aspect, or the second implementation of the third aspect of the embodiments of the present invention, in a third implementation of the third aspect of the embodiments of the present invention, the configuration information further includes feedback interval information, the feedback interval information is used to indicate an interval for sending feedback information when the base station performs data exchange with the terminal, and the feedback interval information includes at least one of an uplink feedback interval or a downlink feedback interval.

With reference to any one of the third aspect, the first implementation of the third aspect, the second implementation of the third aspect, or the third implementation of the third aspect of the embodiments of the present invention, in a fourth implementation of the third aspect of the embodiments of the present invention, the symbol quantity information includes at least one of a quantity of symbols that are used by the base station to send the data to the terminal or a quantity of symbols that are usable when the terminal sends the data to the base station, and the quantity of symbols that are usable when the terminal sends the data to the base station is one or more values.

With reference to any one of the third aspect, the first implementation of the third aspect, the second implementation of the third aspect, the third implementation of the third aspect, or the fourth implementation of the third aspect of the embodiments of the present invention, in a fifth implementation of the third aspect of the embodiments of the present invention, the sending, by the base station, data to the terminal in unit of a symbol includes:

sending, by the base station, the data to the terminal in unit of a symbol by using a symbol physical downlink control channel Sym-PDCCH and a physical downlink shared channel PDSCH, where the Sym-PDCCH is used to schedule a PDSCH corresponding to the quantity of symbols that are used by the base station.

With reference to the fifth implementation of the third aspect of the embodiments of the present invention, in a sixth implementation of the third aspect of the embodiments of the present invention, the Sym-PDCCH includes modulation and coding scheme MCS control information of at least one frequency band.

With reference to any one of the third aspect, the first implementation of the third aspect, the second implementation of the third aspect, the third implementation of the third aspect, the fourth implementation of the third aspect, the fifth implementation of the third aspect, or the sixth implementation of the third aspect of the embodiments of the present invention, in a seventh implementation of the third aspect of the embodiments of the present invention, the method further includes:

sending, by the base station, an uplink grant to the terminal;

receiving, by the base station, the data sent by the terminal in unit of a symbol; and sending, by the base station, feedback information to the terminal in unit of a symbol, where a format used for the feedback information is a control signaling format used by the symbol physical downlink control channel Sym-PDCCH.

With reference to any one of the third aspect, the first implementation of the third aspect, the second implementation of the third aspect, the third implementation of the third aspect, the fourth implementation of the third aspect, the fifth implementation of the third aspect, the sixth implementation of the third aspect, or the seventh implementation of the third aspect of the embodiments of the present invention, in an eighth implementation of the third aspect of the embodiments of the present invention, the sending, by the base station, data to the terminal in unit of a symbol includes:

receiving, by the base station, a reference signal sent by the terminal in unit of a symbol on non-consecutive frequency domain resources.

With reference to any one of the third aspect, the first implementation of the third aspect, the second implementation of the third aspect, the third implementation of the third aspect, the fourth implementation of the third aspect, the fifth implementation of the third aspect, the sixth implementation of the third aspect, the seventh implementation of the third aspect, or the eighth implementation of the third aspect of the embodiments of the present invention, in a ninth implementation of the third aspect of the embodiments of the present invention, the sending, by a base station, configuration information to a terminal includes:

sending, by the base station, the configuration information by using any one of radio resource control RRC signaling, a media access control control element MAC CE, or physical layer control signaling.

A fourth aspect of the embodiments of the present invention provides a data transmission method, including:

receiving, by a terminal, configuration information sent by a base station, where the configuration information includes symbol quantity information, and the symbol quantity information is used to indicate a quantity of symbols that are used when the base station performs data exchange with the terminal; and sending, by the terminal, data to the base station in unit of a symbol, or receiving data sent by the base station in unit of a symbol, where the data occupies m symbols in a time domain, and m is the quantity that is indicated in the configuration information and that is of symbols that are used.

With reference to the fourth aspect of the embodiments of the present invention, in a first implementation of the fourth aspect of the embodiments of the present invention, the data transmitted in unit of a symbol includes to-be-transmitted data in a data packet that is coded and modulated in unit of a symbol.

With reference to the fourth aspect or the first implementation of the fourth aspect of the embodiments of the present invention, in a second implementation of the fourth aspect of the embodiments of the present invention, before the receiving, by a terminal, configuration information sent by a base station, the method further includes:

sending, by the terminal, symbol-level transmission capability information to the base station, where the symbol-level transmission capability information indicates that the terminal has a capability of performing data exchange in unit of the symbol.

With reference to any one of the fourth aspect, the first implementation of the fourth aspect, or the second implementation of the fourth aspect of the embodiments of the present invention, in a third implementation of the fourth aspect of the embodiments of the present invention, the configuration information further includes feedback interval information, the feedback interval information is used to indicate an interval for sending feedback information when the base station performs data exchange with the terminal, and the feedback interval information includes at least one of an uplink feedback interval or a downlink feedback interval.

With reference to any one of the fourth aspect, the first implementation of the fourth aspect, the second implementation of the fourth aspect, or the third implementation of the fourth aspect of the embodiments of the present invention, in a fourth implementation of the fourth aspect of the embodiments of the present invention, the symbol quantity information includes at least one of a quantity of symbols that are used by the base station to send the data to the terminal or a quantity of symbols that are usable when the terminal sends the data to the base station, and the quantity of symbols that are usable when the terminal sends the data to the base station is one or more values.

With reference to any one of the fourth aspect, the first implementation of the fourth aspect, the second implementation of the fourth aspect, the third implementation of the fourth aspect, or the fourth implementation of the fourth aspect of the embodiments of the present invention, in a fifth implementation of the fourth aspect of the embodiments of the present invention, the receiving, by the terminal, data sent by the base station in unit of a symbol includes:

receiving, by the terminal, the data sent by the base station in unit of a symbol by using a symbol physical downlink control channel Sym-PDCCH and a physical downlink shared channel PDSCH, where the Sym-PDCCH is used to schedule a PDSCH corresponding to the quantity of symbols that are used by the base station.

With reference to the fifth implementation of the fourth aspect of the embodiments of the present invention, in a sixth implementation of the fourth aspect of the embodiments of the present invention, the Sym-PDCCH includes modulation and coding scheme MCS control information of at least one frequency band.

With reference to any one of the fourth aspect, the first implementation of the fourth aspect, the second implementation of the fourth aspect, the third implementation of the fourth aspect, the fourth implementation of the fourth aspect, the fifth implementation of the fourth aspect, or the sixth implementation of the fourth aspect of the embodiments of the present invention, in a seventh implementation of the fourth aspect of the embodiments of the present invention, the method further includes:

receiving, by the terminal, an uplink grant sent by the base station;

sending, by the terminal, the data to the base station in unit of a symbol; and receiving, by the terminal, feedback information sent by the base station in unit of a symbol, where a format used for the feedback information is a control signaling format used by the symbol physical downlink control channel Sym-PDCCH.

With reference to any one of the fourth aspect, the first implementation of the fourth aspect, the second implementation of the fourth aspect, the third implementation of the fourth aspect, the fourth implementation of the fourth aspect, the fifth implementation of the fourth aspect, the sixth implementation of the fourth aspect, or the seventh implementation of the fourth aspect of the embodiments of the present invention, in an eighth implementation of the fourth aspect of the embodiments of the present invention, the sending, by the terminal, data to the base station in unit of a symbol includes:

sending, by the terminal, a reference signal to the base station in unit of a symbol on non-consecutive frequency domain resources.

With reference to any one of the fourth aspect, the first implementation of the fourth aspect, the second implementation of the fourth aspect, the third implementation of the fourth aspect, the fourth implementation of the fourth aspect, the fifth implementation of the fourth aspect, the sixth implementation of the fourth aspect, the seventh implementation of the fourth aspect, or the eighth implementation of the fourth aspect of the embodiments of the present invention, in a ninth implementation of the fourth aspect of the embodiments of the present invention, the receiving, by a terminal, configuration information sent by a base station includes:

receiving, by the terminal, the configuration information sent by the base station by using any one of radio resource control RRC signaling, a media access control control element MAC CE, or physical layer control signaling.

The embodiments of the present invention include a data transmission method, so as to improve service scheduling flexibility. The method includes: sending, by a base station, configuration information to a terminal, where the configuration information includes symbol quantity information, and the symbol quantity information is used to indicate a quantity of symbols that are used when the base station performs data exchange with the terminal; and sending, by the base station to the terminal, data transmitted in unit of a symbol, or receiving data transmitted in unit of a symbol, where the data occupies m symbols in a time domain, and m is a quantity that is indicated by the configuration information and that is of symbols that are used. In this way, before the base station performs data exchange with the terminal, the base station sends the symbol quantity information to the terminal, so that the terminal can not only learn of the quantity of symbols that are used by the base station to send the data to the terminal, but also can determine the quantity of symbols that are required by the terminal to send the data to the base station, so as to perform data exchange. This avoids a prior-art case in which symmetrical quantities of subframes or symbols need to be used for uplink and downlink data transmission, and improves service scheduling flexibility.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
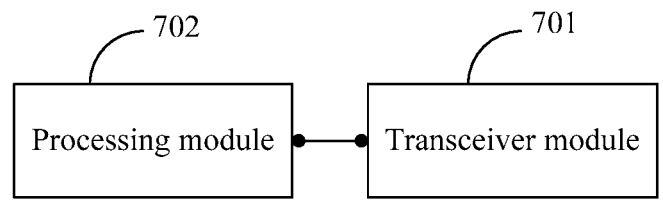
FIG. 1 is a schematic diagram of a base station according to an embodiment of the present invention.

Embodiments of the present invention disclose a data transmission method and an apparatus. Referring to FIG. 1, an embodiment of a base station according to the embodiments of the present invention includes a transceiver module 701 and a processing module 702.

The transceiver module 701 is configured to send configuration information to a terminal, where the configuration information includes symbol quantity information, and the symbol quantity information is used to indicate a quantity of symbols that are used when the base station performs data exchange with the terminal.

For details, refer to S101.

The transceiver module 701 is further configured to: send data to the terminal in unit of a symbol, or receive data sent by the terminal in unit of a symbol, where the data occupies m symbols in a time domain, and m is the quantity that is indicated in the configuration information and that is of symbols that are used.

For details, refer to S102.

The processing module 702 is configured to: control the transceiver module 701 to send the configuration information to the terminal, and control the transceiver module 701 to send the data to the terminal in unit of a symbol.

Optionally, on a basis of the embodiment corresponding to FIG. 1, the processing module 702 is further configured to obtain symbol-level transmission capability information of the terminal before controlling the transceiver module 701 to send the configuration information to the terminal, where the symbol-level transmission capability information indicates that the terminal has a capability of performing data exchange in unit of the symbol.

For details, refer to S201.

Optionally, the data transmitted in unit of a symbol includes to-be-transmitted data in a data packet that is coded and modulated in unit of a symbol. The configuration information further includes feedback interval information. The feedback interval information is used to indicate an interval for sending feedback information when the base station performs data exchange with the terminal. The feedback interval information includes at least one of an uplink feedback interval or a downlink feedback interval. The symbol quantity information includes at least one of a quantity of symbols that are used by the base station to send the data to the terminal or a quantity of symbols that are usable when the terminal sends the data to the base station. The quantity of symbols that are usable when the terminal sends the data to the base station is one or more values.

For details, refer to S202.

Optionally, the transceiver module 701 is further specifically configured to: send, to the terminal in unit of a symbol, to-be-transmitted data in a data packet that is coded and modulated in unit of a symbol, where the data occupies m symbols in the time domain, and m is the quantity that is indicated in the configuration information and that is of symbols that are used.

Optionally, the transceiver module 701 is further specifically configured to:

receive the data sent by the terminal in unit of a symbol, where the data occupies m symbols in the time domain, and m is a quantity of symbols that is determined by the terminal according to the quantity of symbols that need to be used.

For details, refer to S203.

Optionally, the transceiver module 701 is specifically configured to:

send the configuration information by using any one of radio resource control RRC signaling, a media access control control element MAC CE, or physical layer control signaling, where the configuration information further includes feedback interval information, the feedback interval information is used to indicate an interval for sending feedback information when the base station performs data exchange with the terminal, and the feedback interval information includes at least one of an uplink feedback interval or a downlink feedback interval; and the symbol quantity information includes at least one of a quantity of symbols that are used by the base station to send the data to the terminal or a quantity of symbols that are usable when the terminal sends the data to the base station, and the quantity of symbols that are usable when the terminal sends the data to the base station is one or more values.

For details, refer to S302.

Optionally, the transceiver module 701 is further specifically configured to:

send the data to the terminal in unit of a symbol by using a symbol physical downlink control channel Sym-PDCCH and a physical downlink shared channel PDSCH, where the PDSCH occupies a channel corresponding to the quantity of symbols that are used by the base station, the Sym-PDCCH occupies one or more symbols in the channel occupied by the PDSCH, the Sym-PDCCH is used to schedule a PDSCH corresponding to the quantity of symbols that are used by the base station, and the Sym-PDCCH includes modulation and coding scheme MCS control information of at least one frequency band.

For details, refer to S303.

Optionally, the transceiver module 701 is further specifically configured to:

receive a reference signal sent by the terminal in unit of a symbol on non-consecutive frequency domain resources.

For details, refer to S303.

Optionally, the transceiver module 701 is further specifically configured to:

send an uplink grant to the terminal;

receive the data sent by the terminal in unit of a symbol; and send feedback information to the terminal in unit of a symbol, where a format used for the feedback information is a control signaling format used by the symbol physical downlink control channel Sym-PDCCH.

For details, refer to S304 to S306.

Figure 2:
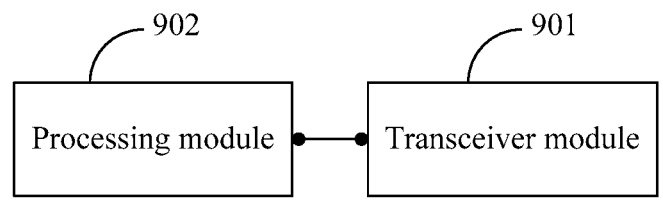
FIG. 2 is a schematic diagram of a terminal according to an embodiment of the present invention.

Referring to FIG. 2, an embodiment of a terminal according to the embodiments of the present invention includes a transceiver module 901 and a processing module 902.

The transceiver module 901 is configured to receive configuration information sent by a base station, where the configuration information includes symbol quantity information, and the symbol quantity information is used to indicate a quantity of symbols that are used when the base station performs data exchange with the terminal.

For details, refer to S401.

The transceiver module 901 is further configured to: send data to the base station in unit of a symbol, or receive data sent by the base station in unit of a symbol, where the data occupies m symbols in a time domain, and m is the quantity that is indicated in the configuration information and that is of symbols that are used.

The processing module 902 is configured to control the transceiver module 901 to send the data to the base station in unit of a symbol.

For details, refer to S402.

Optionally, on a basis of the embodiment corresponding to FIG. 2, the transceiver module 901 is further configured to send symbol-level transmission capability information of the terminal to the base station before receiving the configuration information sent by the base station, where the symbol-level transmission capability information indicates that the terminal has a capability of performing data exchange in unit of the symbol.

For details, refer to S501.

Optionally, the processing module 902 is further configured to:

control the transceiver module 901 to send symbol-level transmission capability information of the terminal to the base station.

Optionally, the data transmitted in unit of a symbol includes to-be-transmitted data in a data packet that is coded and modulated in unit of a symbol. The configuration information further includes feedback interval information. The feedback interval information is used to indicate an interval for sending feedback information when the base station performs data exchange with the terminal, and the feedback interval information includes at least one of an uplink feedback interval or a downlink feedback interval. The symbol quantity information includes at least one of a quantity of symbols that are used by the base station to send the data to the terminal or a quantity of symbols that are usable when the terminal sends the data to the base station. The quantity of symbols that are usable when the terminal sends the data to the base station is one or more values.

Optionally, the transceiver module 901 is specifically configured to:

send, to the base station, to-be-transmitted data in a data packet that is coded and modulated in unit of a symbol, where the data occupies m symbols in the time domain, and m is a quantity of symbols that is determined by the terminal according to the quantity of symbols that need to be used; or receive to-be-transmitted data in a data packet that is coded and modulated in unit of a symbol, where the data occupies m symbols in the time domain, and m is the quantity that is indicated in the configuration information and that is of symbols that are used.

For details, refer to S503.

Optionally, the transceiver module 901 is further specifically configured to:

receive the configuration information sent by the base station by using any one of radio resource control RRC signaling, a media access control control element MAC CE, or physical layer control signaling, where the configuration information includes at least one of a quantity of symbols that are used by the base station to send the data to the terminal or a quantity of symbols that are usable when the terminal sends the data to the base station, and the quantity of symbols that are usable when the terminal sends the data to the base station is one or more values; and the configuration information further includes feedback interval information, the feedback interval information is used to indicate an interval for sending feedback information when the base station performs data exchange with the terminal, and the feedback interval information includes at least one of an uplink feedback interval or a downlink feedback interval.

For details, refer to S602.

Optionally, the transceiver module 901 is further specifically configured to:

send, to the base station, to-be-transmitted data in a data packet that is coded and modulated in unit of a symbol, where the data occupies m symbols in the time domain, and m is a quantity of symbols that is determined by the terminal according to the quantity of symbols that need to be used.

Optionally, the transceiver module 901 is further specifically configured to:

send a reference signal to the base station in unit of a symbol on non-consecutive frequency domain resources.

Optionally, the transceiver module 901 is further specifically configured to:

send the data to the base station in unit of a symbol by using a symbol physical downlink control channel Sym-PDCCH and a physical downlink shared channel PDSCH, where the PDSCH occupies a channel corresponding to the quantity of symbols that are used by the base station, the Sym-PDCCH occupies one or more symbols in the channel occupied by the PDSCH, the Sym-PDCCH is used to schedule a PDSCH corresponding to the quantity of symbols that are used by the base station, and the Sym-PDCCH includes modulation and coding scheme MCS control information of at least one frequency band.

For details, refer to S603.

Optionally, the transceiver module 901 is further specifically configured to:

receive an uplink grant sent by the base station;
send the data to the base station in unit of a symbol; and
receive feedback information sent by the base station in unit of a symbol, where a format used for the feedback information is a control signaling format used by the symbol physical downlink control channel Sym-PDCCH.

For details, refer to S604 to S606.

Figure 3:
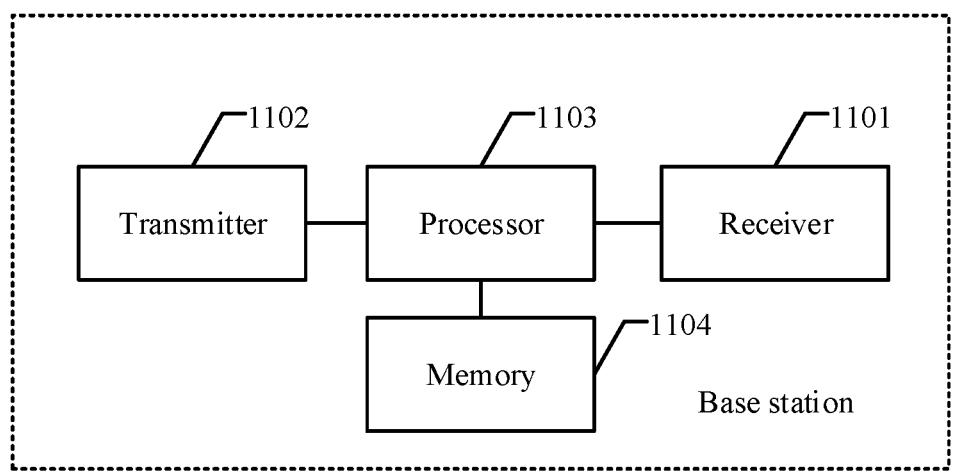
FIG. 3 is a schematic diagram of another base station according to an embodiment of the present invention.

FIG. 3 is another schematic structural diagram of a base station according to an embodiment of the present invention. The base station may include at least one receiver 1101, at least one transmitter 1102, at least one processor 1103, and a memory 1104.

The base station in this embodiment of the present invention may have more or fewer parts than those shown in FIG. 3, may combine two or more parts, or may have different part configurations or arrangements. Various parts may be implemented by using hardware including one or more signal processors and/or application-specific integrated circuits, software, or a combination of hardware and software.

Specifically, the transmitter 1102 may implement a function that the transceiver module 701 performs a sending operation in the embodiment in FIG. 1.

The receiver 1101 may implement a function that the transceiver module 901 performs a receiving operation in the embodiment in FIG. 2.

The processor 1103 may implement functions of the processing module 702 in the embodiment in FIG. 1.

Figure 4:
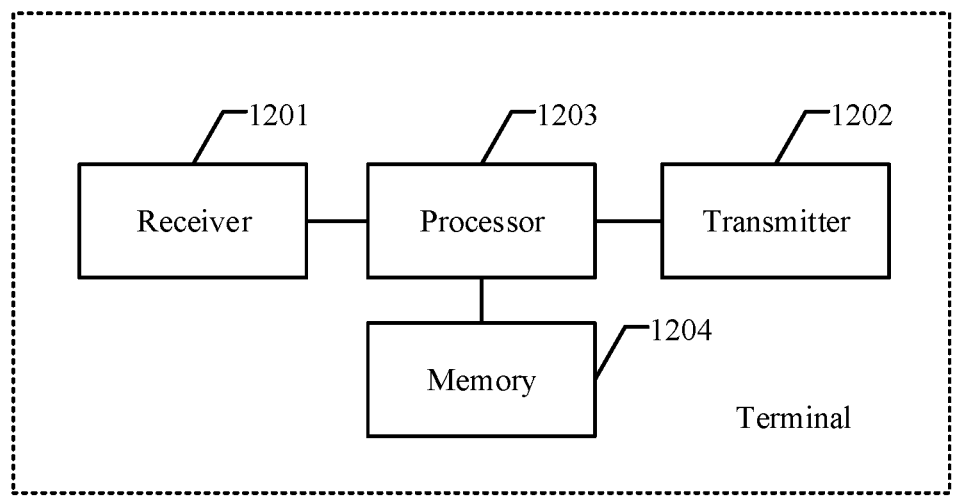
FIG. 4 is a schematic diagram of another terminal according to an embodiment of the present invention.

FIG. 4 is another schematic structural diagram of a terminal according to an embodiment of the present invention. The terminal may include at least one receiver 1201, at least one transmitter 1202, at least one processor 1203, and a memory 1204.

The terminal in this embodiment of the present invention may have more or fewer parts than those shown in FIG. 4, may combine two or more parts, or may have different part configurations or arrangements. Various parts may be implemented by using hardware including one or more signal processors and/or application-specific integrated circuits, software, or a combination of hardware and software.

Specifically, the transmitter 1202 may implement a function that the transceiver module 901 performs a sending operation in the embodiment in FIG. 2.

The receiver 1201 may implement a function that the transceiver module 901 performs a receiving operation in the embodiment in FIG. 2.

The processor 1203 may implement functions of the processing module 902 in the embodiment in FIG. 2.

Figure 5:
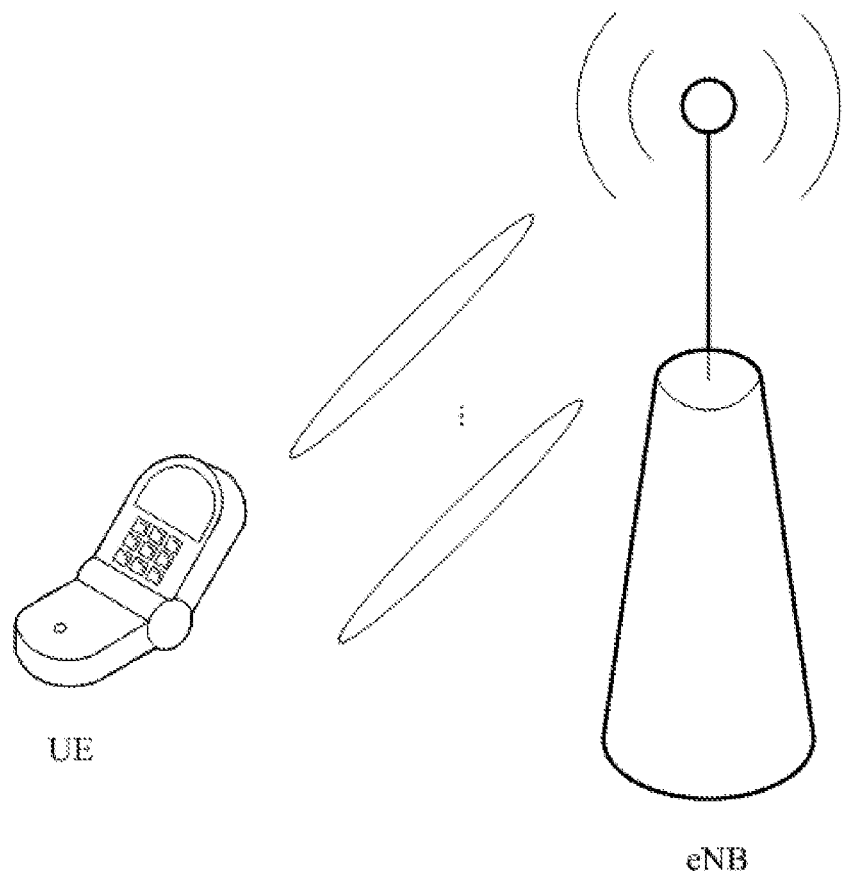
FIG. 5 is a schematic diagram of a specific application scenario according to an embodiment of the present invention.

The following provides description by using an example. In a specific example, a terminal is UE, and a base station is an eNB. Referring to FIG. 5, an embodiment of a specific application scenario of a data transmission device according to the embodiments of the present invention includes the following steps:

UE sends symbol-level transmission capability information to an eNB.

The eNB sends configuration information to the UE by sending RRC signaling, where the configuration information includes a quantity of symbols that are used when the eNB sends data to the UE, that is, 3, and further includes a quantity of symbols that are used when the UE sends data to the eNB, that is, any one of 4, 5, or 6.

The eNB sends, to the terminal by using a symbol physical downlink control channel Sym-PDCCH and a physical downlink shared channel PDSCH, data transmitted in unit of three symbols.

The eNB sends an uplink grant to the UE, and the UE sends the data to the eNB in unit of five symbols.

The eNB feeds back the data to the UE, where a format used by the eNB to feed back the data is a control signaling format used by the Sym-PDCCH.

Figure 6:
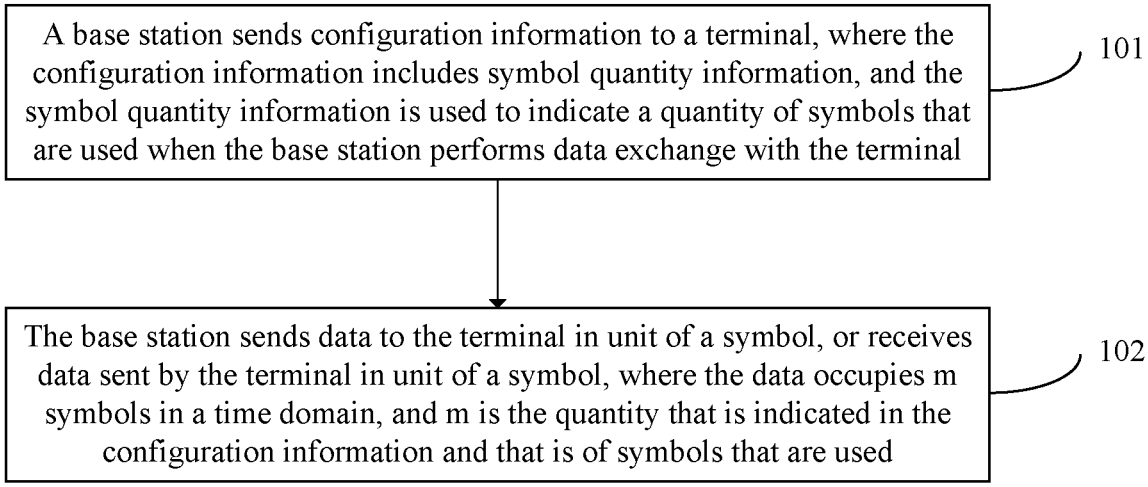
FIG. 6 is a schematic diagram of a data transmission method according to an embodiment of the present invention.

Referring to FIG. 6, an embodiment of a data transmission method according to the embodiments of the present invention includes the following steps.

101. A base station sends configuration information to a terminal, where the configuration information includes symbol quantity information, and the symbol quantity information is used to indicate a quantity of symbols that are used when the base station performs data exchange with the terminal.

In an existing LTE system architecture, when the base station performs data exchange with the terminal, a quantity of frames or subframes for mutual transmission is preset by using a control protocol, and a quantity of frames or subframes for downlink transmission and a quantity of frames or subframes for uplink transmission are symmetrical. However, in practical application, uplink data and downlink data of a service are generally asymmetric. Therefore, when the uplink data and the downlink data of the service are asymmetric, resources are wasted, or resources are insufficient and more frames or subframes are required for data transmission. This increases a transmission delay. In the present invention, the base station sends the symbol quantity information to the terminal to indicate the quantity of symbols that are used when the base station performs data exchange with the terminal. The base station may send information about a quantity of symbols that are used to the terminal according to a resource required for an actual service, so that the terminal learns of a quantity of symbols that are used by the base station to send data and a quantity of symbols that need to be used when the terminal sends data to the base station. In this way, fewer resources are wasted, and a transmission delay is reduced.

It should be noted that the symbol in this embodiment of the present invention is a minimum unit in a time domain, for example, an OFDM symbol.

Optionally, the configuration information further includes feedback interval information. The feedback interval information is used to indicate a feedback interval when the base station performs data exchange with the terminal, and the feedback interval information includes an uplink feedback interval and a downlink feedback interval.

The configuration information sent by the base station to the terminal further includes the uplink feedback interval and the downlink feedback interval, so that when receiving data sent by the base station, the terminal may determine a service process of the terminal according to the downlink feedback interval of the base station. This avoids a greater data transmission delay occurring because the terminal is executing another service process when the base station sends the data to the terminal. Likewise, the base station determines a service process of the base station according to the uplink feedback interval of the terminal.

It should be noted that the configuration information further includes feedback interval information, the feedback interval information is used to indicate a feedback interval when the base station performs data exchange with the terminal, and the feedback interval information includes an uplink feedback interval and a downlink feedback interval. A beneficial effect brought by this feature is reducing a transmission delay between the base station and the terminal, and is a non-mandatory technical feature in this embodiment of the present invention for resolving a prior-art problem of inflexible service scheduling.

102. The base station sends data to the terminal in unit of a symbol, or receives data sent by the terminal in unit of a symbol, where the data occupies m symbols in a time domain, and m is the quantity that is indicated in the configuration information and that is of symbols that are used.

A purpose of transmitting data in unit of a symbol is to increase a data transmission rate between the base station and the terminal and implement data exchange at a shorter delay. The base station performs data exchange with the terminal by using the configuration information that includes the quantity of symbols that are used, so as to improve service scheduling flexibility. It should be noted that the data occupies the m symbols in the time domain, and m is a natural number greater than or equal to 1. In addition, the quantity m of symbols that are used when the base station sends the data to the terminal and the quantity m of symbols that are used when the base station receives the data sent by the terminal may be the same, or may be different. This depends on an actual service scheduling status, and is not limited herein.

In this embodiment of the present invention, before a base station performs data exchange with a terminal, the base station sends symbol quantity information to the terminal, so that the terminal can not only learn of a quantity of symbols that are used by the base station to send data to the terminal, but also can determine a quantity of symbols that are required by the terminal to send data to the base station, so as to perform data exchange. This avoids a prior-art case in which symmetrical quantities of subframes or symbols need to be used for uplink and downlink data transmission, and improves service scheduling flexibility.

Figure 7:
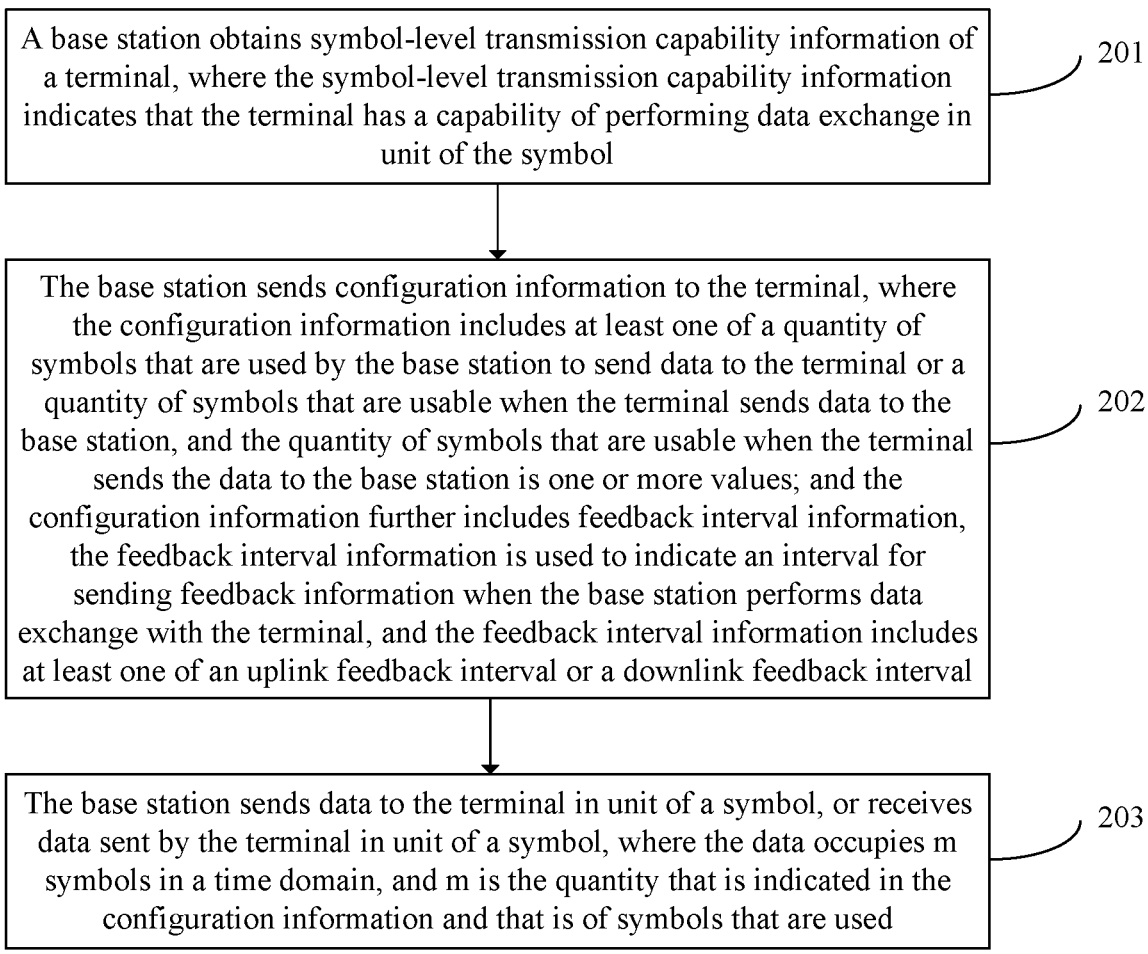
FIG. 7 is a schematic diagram of another data transmission method according to an embodiment of the present invention.

In the foregoing embodiment, a base station sends configuration information to a terminal, the configuration information includes symbol quantity information, and the symbol quantity information is used to indicate a quantity of symbols that are used when the base station performs data exchange with the terminal. The base station sends data to the terminal in unit of a symbol, or receives data sent by the terminal in unit of a symbol. The data occupies m symbols in a time domain, and m is the quantity that is indicated in the configuration information and that is of symbols that are used. In practical application, the base station may further obtain symbol-level transmission capability information of the terminal first. The configuration information further includes feedback interval information, and the symbol quantity information may include a quantity of symbols that are used by the base station to send the data to the terminal and a quantity of symbols that are usable when the terminal sends the data to the base station. Details are provided below. Referring to FIG. 7, another embodiment of a data transmission method according to the embodiments of the present invention includes the following steps.

201. A base station obtains symbol-level transmission capability information of a terminal, where the symbol-level transmission capability information indicates that the terminal has a capability of performing data exchange in unit of the symbol.

When the base station performs symbol-level data transmission with the terminal, the terminal has the symbol-level transmission capability, and the base station first obtains the symbol-level transmission capability information of the terminal. This can improve reliability of the symbol-level transmission between the base station and the terminal. A detailed process of obtaining the symbol-level transmission capability information of the terminal by the base station is as follows: The terminal sends the symbol-level transmission capability information of the terminal to a network side, and then the base station obtains the symbol-level transmission capability information of the terminal from the network side; or the base station sends a request for the symbol-level transmission capability information of the terminal to the terminal, and the terminal sends the symbol-level transmission capability information to the base station after receiving the request.

In addition, it should be noted that the symbol-level transmission capability information of the terminal may be preset in the base station during system initialization. Therefore, when the base station performs data exchange with the terminal, the base station has obtained the symbol-level transmission capability information of the terminal.

202. The base station sends configuration information to the terminal, where the configuration information includes at least one of a quantity of symbols that are used by the base station to send data to the terminal or a quantity of symbols that are usable when the terminal sends data to the base station, and the quantity of symbols that are usable when the terminal sends the data to the base station is one or more values; and the configuration information further includes feedback interval information, the feedback interval information is used to indicate an interval for sending feedback information when the base station performs data exchange with the terminal, and the feedback interval information includes at least one of an uplink feedback interval or a downlink feedback interval.

The configuration information sent by the base station to the terminal includes the quantity of symbols that are used when the base station sends the data to the terminal. When receiving the data sent by the base station, the terminal may learn of the quantity of symbols that are used for the data, so that the terminal can quickly parse the data sent by the base station. The configuration information sent by the base station to the terminal includes the quantity of symbols that are usable when the terminal sends the data to the base station, and the quantity of symbols that are usable when the terminal sends the data to the base station is one or more values. When sending the data to the base station, the terminal may determine a quantity of symbols that are used to send the data to the base station. In this way, resource utilization and service scheduling flexibility are improved.

The configuration information sent by the base station to the terminal further includes the at least one of the uplink feedback interval or the downlink feedback interval. When the configuration information includes the downlink feedback interval, the terminal may determine a service process of the terminal according to the downlink feedback interval of the base station when receiving the data sent by the base station. This avoids a greater data transmission delay occurring because the terminal is executing another service process when the base station sends the data to the terminal. Likewise, when the configuration information includes the uplink feedback interval, the base station determines a service process of the base station according to the uplink feedback interval of the terminal.

203. The base station sends data to the terminal in unit of a symbol, or receives data sent by the terminal in unit of a symbol, where the data occupies m symbols in a time domain, and m is the quantity that is indicated in the configuration information and that is of symbols that are used.

In an existing LTE system architecture, a subframe or a timeslot is used as a minimum unit for data exchange, and therefore, a data packet is coded and modulated in unit of a subframe or a timeslot each time. In the present invention, when transmission is performed in unit of a symbol, a data packet is coded and modulated in unit of a symbol each time, so as to achieve a finer time granularity and higher flexibility.

The configuration information sent by the base station to the terminal may include the quantity of symbols that need to be used when the terminal sends the data to the base station, and the quantity of symbols that need to be used may be one value, or may be multiple values. For example, in the configuration information, the quantity of symbols that are usable when the terminal sends the data to the base station may be 2, 3, or 4. The terminal selects one value thereof to determine the quantity of symbols that are used to send the data to the base station, for example, 3. In practical application, when the base station performs data exchange with the terminal, service scheduling is usually performed for multiple times. For example, when a service is performed between the base station and the terminal, service scheduling may need to be performed for 10 times. In this case, a case in which the terminal selects a quantity of symbols that need to be used, to determine the quantity of symbols that are used may be changed according to an actual situation. For example, after data transmission of three times, the terminal re-determines a quantity of symbols that are used, to perform data exchange. Specifically, configuration may be performed in a periodic manner as described above, in an event-triggered manner, or in a timer-based manner. This is not limited herein.

It should be noted that when the quantity of symbols that are used by the terminal to send the data to the base station in the configuration information is multiple values, the terminal may further send indication information to the base station after determining one from the multiple quantities of symbols. The indication information is used to indicate the quantity of symbols that is determined by the terminal, that is, the quantity of symbols that are used when the terminal sends the data to the base station, so that the base station can correctly parse the data sent by the terminal. If the terminal does not send the indication information to the base station, the base station can still parse, by means of blind detection, the data sent by the terminal. For example, in the configuration information, the quantity of symbols that are usable when the terminal sends the data to the base station may be 2, 3, or 4. After the terminal determines the quantity of symbols, for example, 3, the terminal sends the data to the base station in unit of three symbols. After receiving the data sent by the terminal, the base station may sequentially parse the received data according to an order of the multiple quantities of symbols that are usable by the terminal to send the data to the base station in the configuration information. The base station first parses the received data by using a length of two symbols. If learning that the data is incorrect after the parsing, the base station continues to parse the data by using a length of three symbols, so as to obtain correct data.

In this embodiment of the present invention, configuration information includes at least one of a quantity of symbols that are used by a base station to send data to a terminal or a quantity of symbols that are usable when a terminal sends data to the base station, and the quantity of symbols that are used by the terminal to send the data to the base station is one or more values. The base station receives data that is sent by the terminal according to a quantity of symbols that is determined according to the quantity of symbols that need to be used, and the data is in a data packet that is coded and modulated in unit of a symbol. In this way, the terminal may select the quantity of symbols that are used to send the data to the base station, so as to improve service scheduling flexibility. The configuration information further includes feedback interval information, and the feedback interval information includes at least one of an uplink feedback interval or a downlink feedback interval. In this way, when the base station performs data exchange with the terminal, a real-time process may be determined according to a feedback time of the peer party, and a network transmission rate is increased.

Figure 8:
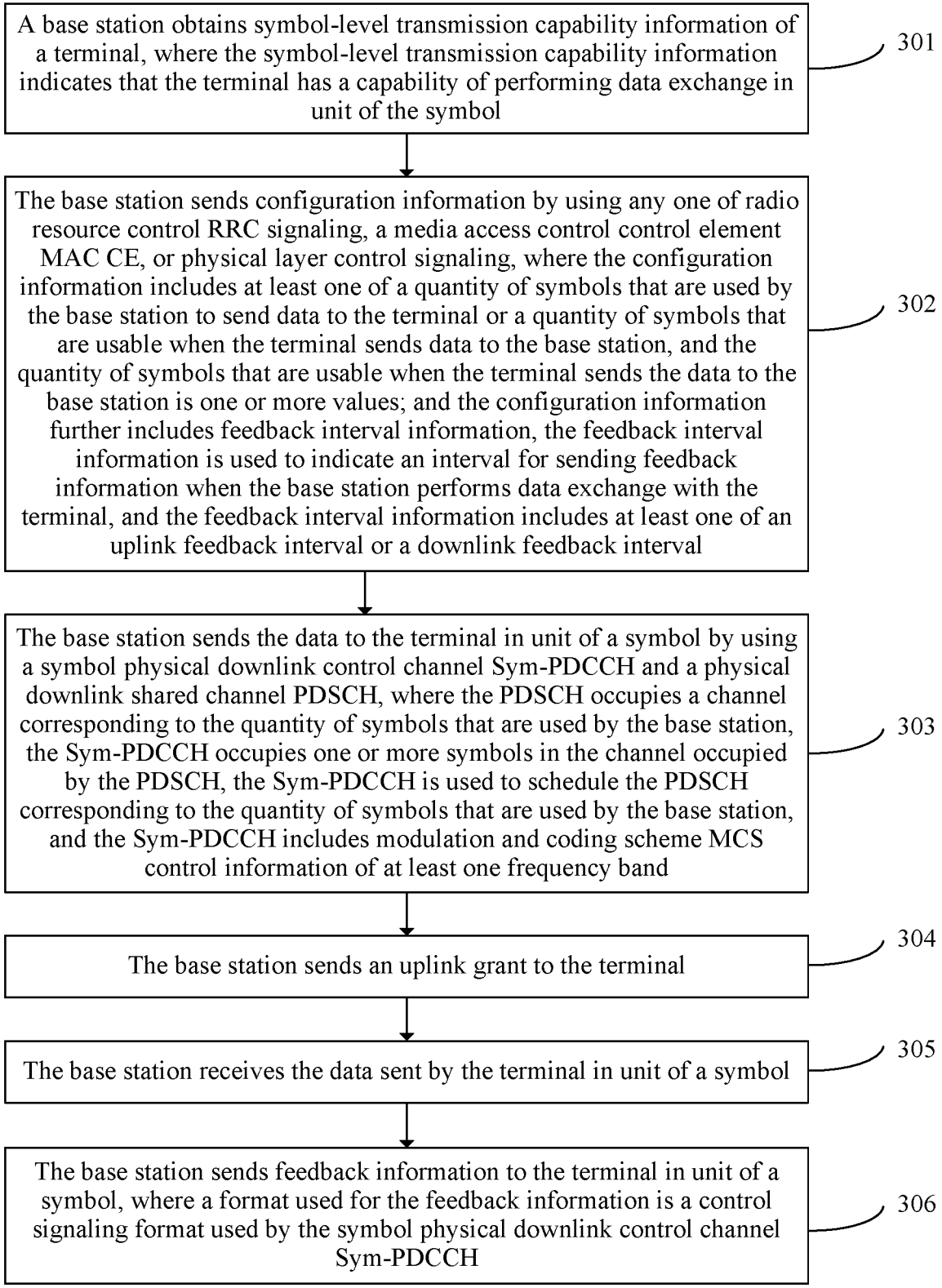
FIG. 8 is a schematic diagram of another data transmission method according to an embodiment of the present invention.

In the foregoing embodiment, a base station sends configuration information to a terminal, the base station sends, to the terminal, data transmitted in unit of a symbol, and the base station receives data that is sent by the terminal according to the configuration information and transmitted in unit of a symbol. In practical application, there are multiple manners in which a base station sends configuration information to a terminal. The base station sends data to the terminal in unit of a symbol, or receives data sent by the terminal in unit of a symbol, and the base station may further control a transmission channel when receiving the data that is sent by the terminal according to the configuration information and transmitted in unit of a symbol. Details are provided below. Referring to FIG. 8, another embodiment of a data transmission method according to the embodiments of the present invention includes the following steps.

301. A base station obtains symbol-level transmission capability information of a terminal, where the symbol-level transmission capability information indicates that the terminal has a capability of performing data exchange in unit of the symbol.

For details, refer to S201.

302. The base station sends configuration information by using any one of radio resource control RRC signaling, a media access control control element MAC CE, or physical layer control signaling, where the configuration information includes at least one of a quantity of symbols that are used by the base station to send data to the terminal or a quantity of symbols that are usable when the terminal sends data to the base station, and the quantity of symbols that are usable when the terminal sends the data to the base station is one or more values; and the configuration information further includes feedback interval information, the feedback interval information is used to indicate an interval for sending feedback information when the base station performs data exchange with the terminal, and the feedback interval information includes at least one of an uplink feedback interval or a downlink feedback interval.

The RRC (Radio Resource Control), the MAC CE (Media Access Control Control Element), and the physical layer control signaling respectively belong to a Layer 3, a Layer 2, and a Layer 1 of a network transmission protocol. Therefore, the base station may send the configuration information to the terminal in any one of the three-layer transmission modes.

303. The base station sends the data to the terminal in unit of a symbol by using a symbol physical downlink control channel Sym-PDCCH and a physical downlink shared channel PDSCH, where the PDSCH occupies a channel corresponding to the quantity of symbols that are used by the base station, the Sym-PDCCH occupies one or more symbols in the channel occupied by the PDSCH, the Sym-PDCCH is used to schedule a PDSCH corresponding to the quantity of symbols that are used by the base station, and the Sym-PDCCH includes modulation and coding scheme MCS control information of at least one frequency band.

Optionally, the base station may further receive a reference signal sent by the terminal in unit of a symbol on non-consecutive frequency domain resources.

In a downlink data transmission process, content transmitted by using the symbol physical layer control channel Sym-PDCCH includes resource location information, used MCS (Modulation and Coding Scheme) information, and the like of a data channel, so that the terminal can decode and receive data according to the resource location information and the MCS information. Compared with a PDCCH in the prior art, the Sym-PDCCH has a shorter length and fewer formats, so that the terminal can decode and receive data more quickly, so as to obtain information about a corresponding downlink shared channel PDSCH, and then receive the data sent by the base station by using the corresponding PDSCH.

In the prior art, when data is sent based on a subframe, the base station sends an MCS only once during scheduling. In the present invention, data is sent based on several symbols. Therefore, the terminal occupies a relatively large quantity of frequency bands in a frequency domain, and when the terminal is at different frequency domain locations, channel quality of the terminal varies. In this embodiment of the present invention, the Sym-PDCCH (Symbol Physical Downlink Control Channel) is used to schedule the PDSCH (Physical Downlink Shared Channel) corresponding to the quantity of symbols that are used by the base station, and the Sym-PDCCH includes the modulation and coding scheme MCS control information of the at least one frequency band. Therefore, different PDSCHs controlled by the Sym-PDCCH include the MCS information of the at least one frequency band, that is, there are multiple pieces of MCS information at different frequency domain locations of the transmission channel. This improves channel transmission efficiency.

In the prior art, because a minimum transmission unit is a subframe, a quantity of terminals that can be scheduled in a single TTI (Transmission Time Interval) is relatively large, and a relatively large amount of control information is required. Therefore, a physical downlink control channel PDCCH and a physical downlink shared channel PDSCH occupy different channels, and the PDCCH needs to occupy a channel individually. In this embodiment of the present invention, because a quantity of resources that are occupied in a single TTI is relatively small, a quantity of terminals that are scheduled in the single TTI is reduced, so as to reduce overheads of a control channel. Therefore, the PDSCH may occupy the channel corresponding to the quantity of symbols that are used by the base station, and the Sym-PDCCH occupies the one or more symbols in the channel occupied by the PDSCH. For example, when the quantity of symbols that are used by the base station is 1, the PDSCH occupies the channel corresponding to the quantity of symbols, and the Sym-PDCCH occupies the one or more symbols in the channel occupied by the PDSCH. When the quantity of symbols that are used by the base station is multiple values, the PDSCH occupies channels corresponding to the multiple quantities of symbols, and the Sym-PDCCH occupies one or more symbols in the channels occupied by the PDSCH. Preferably, the Sym-PDCCH occupies the first symbol in the multiple channels occupied by the PDSCH. In this embodiment of the present invention, because a minimum symbol unit used for data exchange between the base station and the terminal is a symbol, an amount of control information that is required is relatively small. Therefore, the Sym-PDCCH does not need to occupy a channel individually, and a channel waste is reduced. Because a symbol is used as a basic unit for transmission, an amount of data that is transmitted each time is smaller than that of data that is transmitted in unit of a subframe. When a quantity of terminals that are scheduled by using each symbol is still the same as a quantity of terminals scheduled by using a subframe, more segments are caused. For example, each terminal needs to transmit 100 bytes, and currently each symbol can be used to transmit only 80 bytes. If each symbol is still used to schedule many terminals, for example, four terminals, each terminal can transmit only 20 bytes on each symbol on average. Therefore, 100 bytes need to be segmented for five times. If each symbol is used to schedule only one terminal, 100 bytes need to be segmented twice. This reduces a quantity of times of segmentation, and reduces a quantity of times of blind detection performed by the terminal.

When the terminal is at different frequency domain locations, channel quality of the terminal varies. Therefore, the terminal may further send a reference signal to estimate the channel quality. In the prior art, the reference signal of the terminal always occupies an entire symbol for transmission. However, in a symbol-level transmission process, if only a single symbol needs to be sent, the terminal cannot send valid data during single-symbol transmission because the reference signal occupies excessive data channels. Therefore, in the present invention, the terminal may send the reference signal in unit of a symbol on the non-consecutive frequency domain resources. Prior to this, the base station may send mask and location information of the reference signals on the non-consecutive frequency domain resources to the terminal, and the base station receives the data according to the mask and location information of the reference signals on the non-consecutive frequency domain resources. In addition, it should be noted that the frequency domain resources used by the terminal to send the reference signals may be partially consecutive.

304. The base station sends an uplink grant to the terminal.

In a downlink direction, the base station can send the data to the terminal. In an uplink direction, if the terminal needs to send the data to the base station, the terminal needs to first receive the uplink grant sent by the base station, and then send the data to the base station.

305. The base station receives the data sent by the terminal in unit of a symbol.

After receiving the uplink grant sent by the base station, the terminal can send the data to the base station in unit of a symbol according to the configuration information.

306. The base station sends feedback information to the terminal in unit of a symbol, where a format used for the feedback information is a control signaling format used by the symbol physical downlink control channel Sym-PDCCH.

Because the base station performs data exchange with the terminal by using a symbol, a quantity of terminals that can be scheduled in a single transmission process is reduced, and a quantity of times that the terminal detects the control channel is reduced. Therefore, the control signaling format used by the Sym-PDCCH may be used as an uplink data feedback format of the terminal, so as to improve system utilization.

In this embodiment of the present invention, a base station sends, to the terminal by using a symbol physical downlink control channel Sym-PDCCH and a physical downlink shared channel PDSCH, data transmitted in unit of a symbol. The Sym-PDCCH is used to schedule a PDSCH corresponding to a quantity of symbols that are used by the base station, and the Sym-PDCCH includes modulation and coding scheme MCS control information. Therefore, different PDSCHs controlled by the Sym-PDCCH include MCS information of at least one frequency band, that is, there are multiple pieces of MCS information at different frequency domain locations of a transmission channel. This improves channel transmission efficiency.

Figure 9:
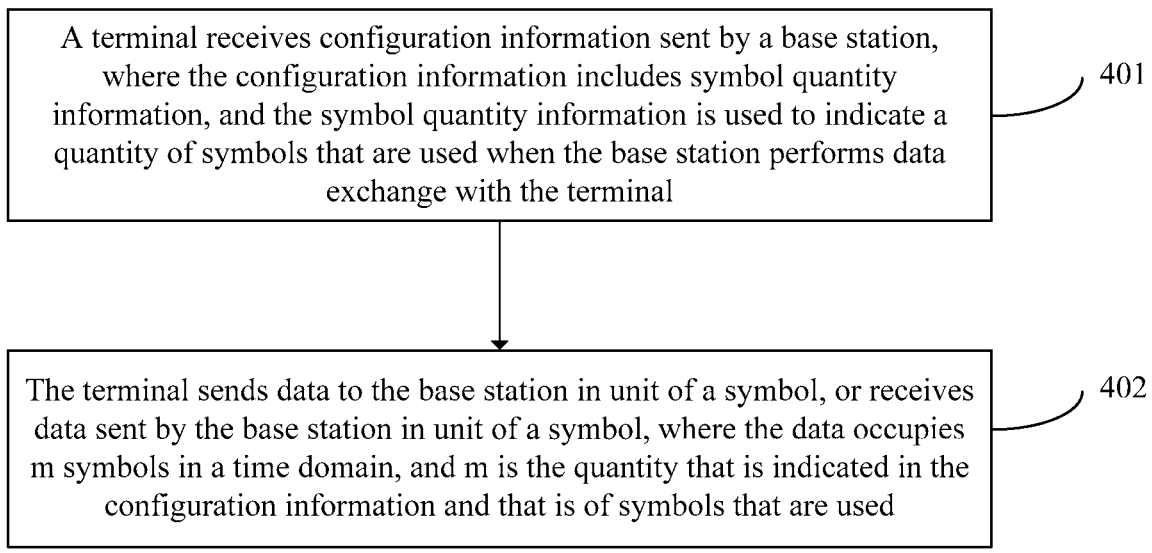
FIG. 9 is a schematic diagram of another data transmission method according to an embodiment of the present invention.

Referring to FIG. 9, another embodiment of a data transmission method according to the embodiments of the present invention includes the following steps:

401. A terminal receives configuration information sent by a base station, where the configuration information includes symbol quantity information, and the symbol quantity information is used to indicate a quantity of symbols that are used when the base station performs data exchange with the terminal.

For details, refer to S101.

402. The terminal sends data to the base station in unit of a symbol, or receives data sent by the base station in unit of a symbol, where the data occupies m symbols in a time domain, and m is the quantity that is indicated in the configuration information and that is of symbols that are used.

For details, refer to S102.

Figure 10:
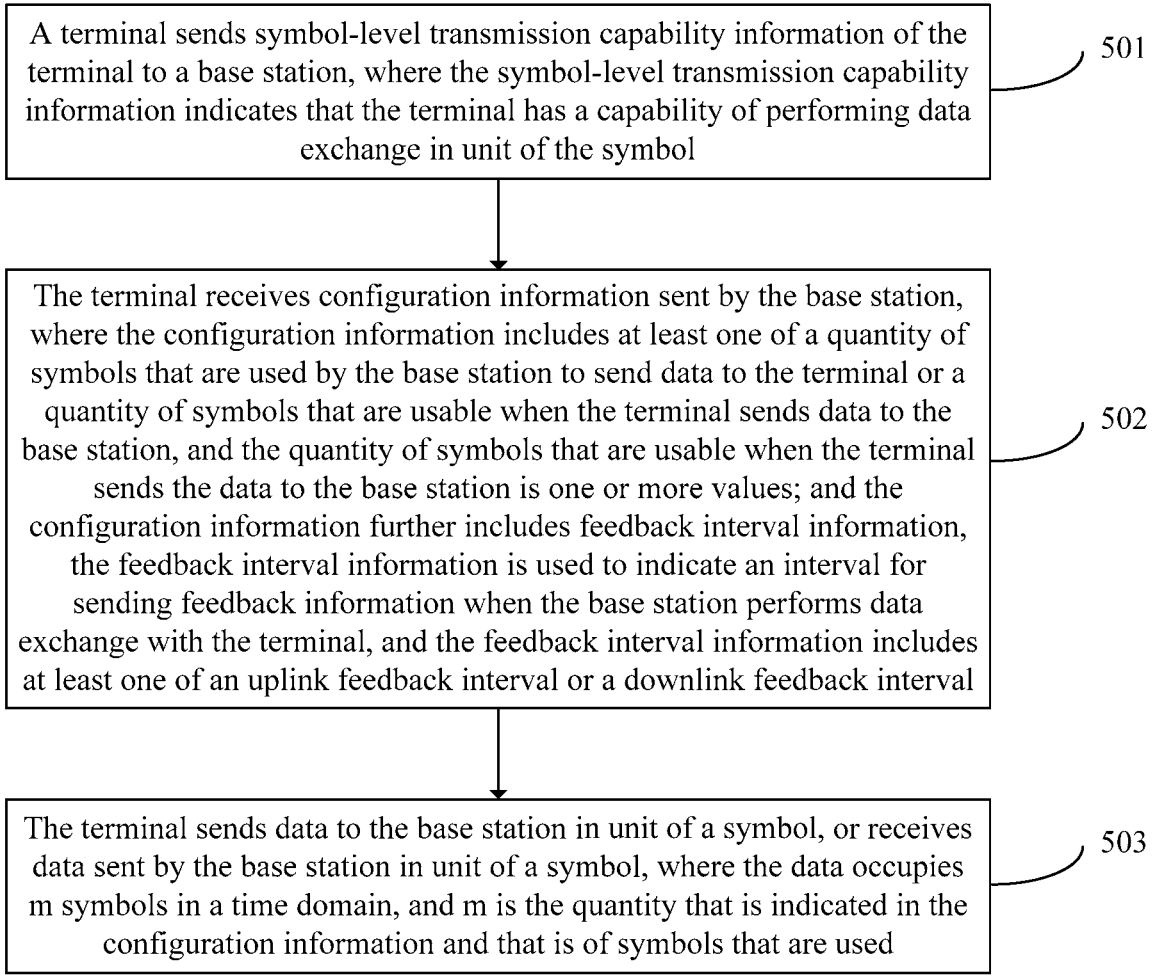
FIG. 10 is a schematic diagram of another data transmission method according to an embodiment of the present invention.

Referring to FIG. 10, another embodiment of a data transmission method according to the embodiments of the present invention includes the following steps:

501. A terminal sends symbol-level transmission capability information of the terminal to a base station, where the symbol-level transmission capability information indicates that the terminal has a capability of performing data exchange in unit of the symbol.

For details, refer to S201.

502. The terminal receives configuration information sent by the base station, where the configuration information includes at least one of a quantity of symbols that are used by the base station to send data to the terminal or a quantity of symbols that are usable when the terminal sends data to the base station, and the quantity of symbols that are usable when the terminal sends the data to the base station is one or more values; and the configuration information further includes feedback interval information, the feedback interval information is used to indicate an interval for sending feedback information when the base station performs data exchange with the terminal, and the feedback interval information includes at least one of an uplink feedback interval or a downlink feedback interval.

For details, refer to S202.

503. The terminal sends data to the base station in unit of a symbol, or receives data sent by the base station in unit of a symbol, where the data occupies m symbols in a time domain, and m is the quantity that is indicated in the configuration information and that is of symbols that are used.

For details, refer to S203.

Figure 11:
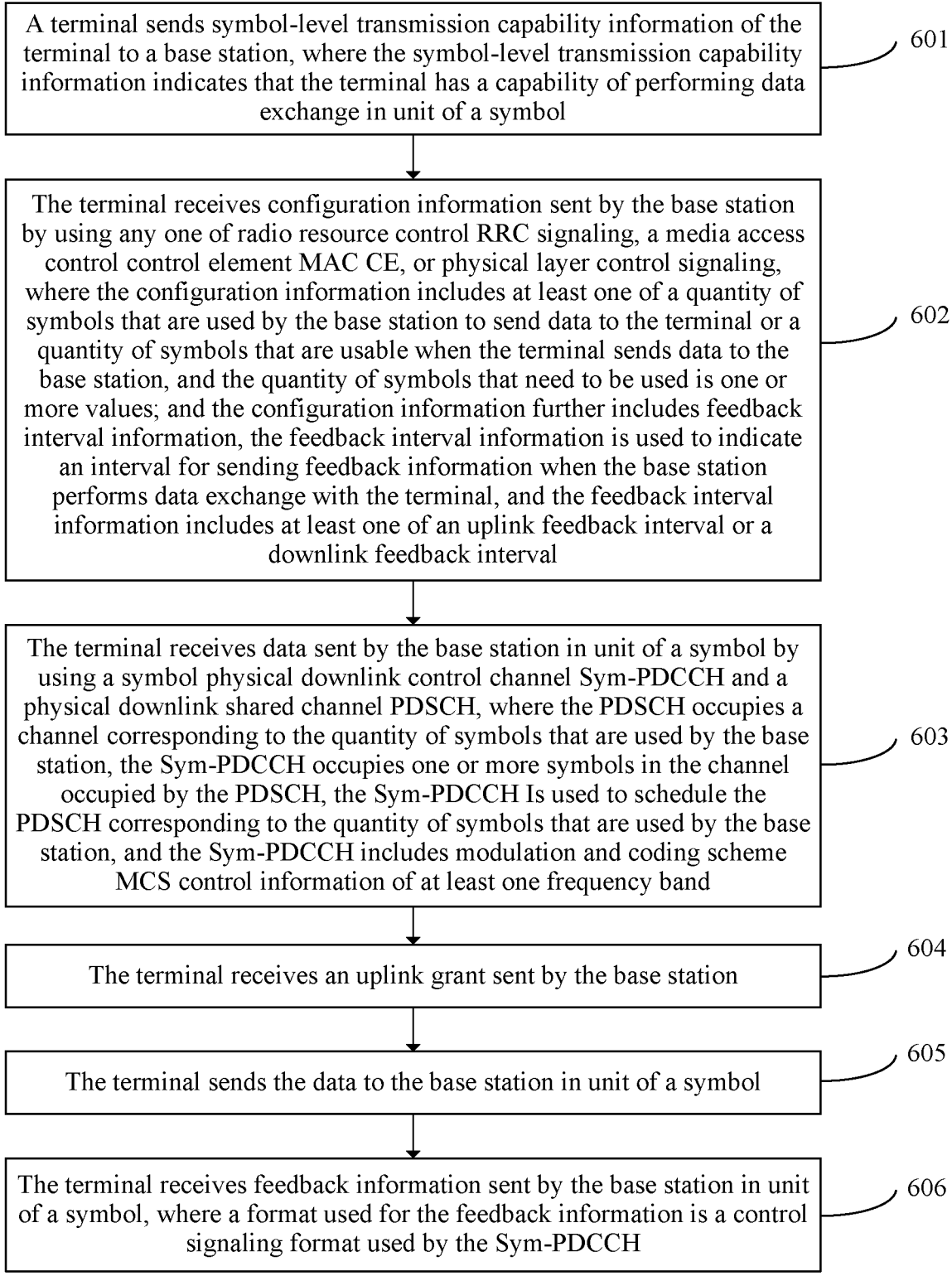
FIG. 11 is a schematic diagram of another data transmission method according to an embodiment of the present invention.

Referring to FIG. 11, another embodiment of a data transmission method according to the embodiments of the present invention includes the following steps:

601. A terminal sends symbol-level transmission capability information of the terminal to a base station, where the symbol-level transmission capability information indicates that the terminal has a capability of performing data exchange in unit of a symbol.

For details, refer to S301.

602. The terminal receives configuration information sent by the base station by using any one of radio resource control RRC signaling, a media access control control element MAC CE, or physical layer control signaling, where the configuration information includes at least one of a quantity of symbols that are used by the base station to send data to the terminal or a quantity of symbols that are usable when the terminal sends data to the base station, and the quantity of symbols that need to be used is one or more values; and the configuration information further includes feedback interval information, the feedback interval information is used to indicate an interval for sending feedback information when the base station performs data exchange with the terminal, and the feedback interval information includes at least one of an uplink feedback interval or a downlink feedback interval.

For details, refer to S302.

603. The terminal receives data sent by the base station in unit of a symbol by using a symbol physical downlink control channel Sym-PDCCH and a physical downlink shared channel PDSCH, where the PDSCH occupies a channel corresponding to the quantity of symbols that are used by the base station, the Sym-PDCCH occupies one or more symbols in the channel occupied by the PDSCH, the Sym-PDCCH is used to schedule a PDSCH corresponding to the quantity of symbols that are used by the base station, and the Sym-PDCCH includes modulation and coding scheme MCS control information of at least one frequency band.

Optionally, the terminal may further send a reference signal to the base station in unit of a symbol on non-consecutive frequency domain resources.

For details, refer to S303.

604. The terminal receives an uplink grant sent by the base station.

For details, refer to S304.

605. The terminal sends the data to the base station in unit of a symbol.

For details, refer to S305.

606. The terminal receives feedback information sent by the base station in unit of a symbol, where a format used for the feedback information is a control signaling format used by the Sym-PDCCH.

For details, refer to S306.

The foregoing embodiments are merely intended to describe the technical solutions of the present invention, but not to limit the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A base station, comprising:
a transceiver, configured to:
send configuration information to a terminal, wherein the configuration information comprises symbol quantity information configuring multiple values for a quantity of symbols that are usable when the base station performs data exchange with the terminal; and
receive data from the terminal, wherein the data is content data separate from control signaling data; and
a processor, configured to parse the data, according to at least one value of the multiple values for the quantity of symbols, by performing blind detection,
wherein the configuration information further comprises feedback interval information, the feedback interval information is used to indicate an interval for sending feedback information when the base station performs data exchange with the terminal, and the feedback interval information comprises at least one of an uplink feedback interval or a downlink feedback interval.

2. The base station according to claim 1, wherein the transceiver is further configured to:
send the configuration information by using any one of radio resource control (RRC) signaling, a media access control control element (MAC CE), or physical layer control signaling.

3. A terminal, comprising:
a transceiver, configured to receive configuration information from a base station, wherein the configuration information comprises symbol quantity information configuring multiple values for a quantity of symbols that are usable when the terminal sends data to the base station, wherein the data is content data separate from control signaling data; and
a processor, configured to determine one value from the multiple values for the quantity of symbols as a quantity of used symbols;
wherein the transceiver is further configured to send the data to the base station according to the quantity of used symbols, and
wherein the configuration information further comprises feedback interval information, the feedback interval information is used to indicate an interval for sending feedback information when the base station performs data exchange with the terminal, and the feedback interval information comprises at least one of an uplink feedback interval or a downlink feedback interval.

4. The terminal according to claim 3, wherein the transceiver is further configured to:
receive the configuration information sent by the base station by using any one of radio resource control (RRC) signaling, a media access control control element (MAC CE), or physical layer control signaling.

5. The terminal according to claim 3, wherein when the processor is configured to determine the one value from the multiple values for the quantity of symbols as the quantity of used symbols, the processor is specifically configured to determine one value from the multiple values for the quantity of symbols as the quantity of used symbols in a periodic manner, an event-triggered manner, or a timer-based manner.

6. A data transmission method, comprising:
sending, by a base station, configuration information to a terminal, wherein the configuration information comprises symbol quantity information configuring multiple values for a quantity of symbols that are usable when the base station performs data exchange with the terminal;
receiving, by the base station, data from the terminal, wherein the data is content data separate from control signaling data; and
parsing, by the base station according to at least one value of the multiple values for the quantity of symbols, the data by performing blind detection,
wherein the configuration information further comprises feedback interval information, the feedback interval information is used to indicate an interval for sending feedback information when the base station performs data exchange with the terminal, and the feedback interval information comprises at least one of an uplink feedback interval or a downlink feedback interval.

7. The method according to claim 6, wherein the sending, by the base station, the configuration information to the terminal comprises:
sending, by the base station, the configuration information by using any one of radio resource control (RRC) signaling, a media access control control element (MAC CE), or physical layer control signaling.

8. A data transmission method, comprising:
receiving, by a terminal, configuration information from a base station, wherein the configuration information comprises symbol quantity information configuring multiple values for a quantity of symbols that are usable when the terminal sends data to the base station, wherein the data is content data separate from control signaling data;

determining, by the terminal, one value from the multiple values for the quantity of symbols as a quantity of used symbols; and sending, by the terminal according to the quantity of used symbols, the data to the base station, wherein the configuration information further comprises feedback interval information, the feedback interval information is used to indicate an interval for sending feedback information when the base station performs data exchange with the terminal, and the feedback interval information comprises at least one of an uplink feedback interval or a downlink feedback interval.

9. The method according to claim 8, wherein the receiving, by the terminal, the configuration information sent by the base station comprises:

receiving, by the terminal, the configuration information sent by the base station by using any one of radio resource control (RRC) signaling, a media access control control element (MAC CE), or physical layer control signaling.

10. The method according to claim 8, wherein the determining, by the terminal, the one value from the multiple values for the quantity of symbols as the quantity of used symbols, comprises:

determining, by the terminal, the one value from the multiple values for the quantity of symbols as the quantity of used symbols in a periodic manner, an event-triggered manner, or a timer-based manner.

\* \* \* \* \*